United States Patent
Merzougui et al.

(10) Patent No.: US 7,220,509 B2
(45) Date of Patent: May 22, 2007

(54) CONSTITUENTS AND METHODS FOR PROTECTING FUEL CELL COMPONENTS, INCLUDING PEMS

(75) Inventors: Belabbes A Merzougui, Warren, MI (US); Andrew M Mance, Royal Oak, MI (US); Tao Xie, Troy, MI (US); Ion C Halalay, Grosse Point, MI (US)

(73) Assignee: General Motors Corporation, Detroit, MI (US)

( * ) Notice: Subject to any disclaimer, the term of this patent is extended or adjusted under 35 U.S.C. 154(b) by 379 days.

(21) Appl. No.: 10/929,190

(22) Filed: Aug. 30, 2004

(65) Prior Publication Data

US 2006/0046120 A1 Mar. 2, 2006

(51) Int. Cl.
*H01M 8/10* (2006.01)
*H01M 4/00* (2006.01)

(52) U.S. Cl. .......................... 429/33; 429/40

(58) Field of Classification Search ................. 429/30, 429/33, 40, 13
See application file for complete search history.

(56) References Cited

U.S. PATENT DOCUMENTS 6,335,112 B1 * 1/2002 Asukabe et al. ............... 429/30

* cited by examiner

*Primary Examiner*—Paul Joseph Ryan
*Assistant Examiner*—Thomas H. Parsons
(74) *Attorney, Agent, or Firm*—Kathryn A. Marra

(57) ABSTRACT

A fuel cell comprising a membrane electrode assembly (MEA) that is made up of a membrane sandwiched between first and second electrodes, a contaminant peroxide, damaging to the MEA, and at least one constituent with the contaminant peroxide that prevents, or at least inhibits, decomposition of at least one of the first electrode, the second electrode, the membrane, and any combination thereof.

30 Claims, 5 Drawing Sheets

11A ↗  ↖ 11B

CONSTITUENTS AND METHODS FOR PROTECTING FUEL CELL COMPONENTS, INCLUDING PEMS

FIELD OF THE INVENTION

The present invention relates to fuel cells, membrane electrode assemblies (MEAs) and proton exchange membranes, also known as polymer electrolyte membranes (PEMs).

BACKGROUND OF THE INVENTION

Electrochemical cells are desirable for various applications, particularly when operated as fuel cells. Fuel cells have been proposed for many applications including electrical vehicular power plants to replace internal combustion engines. One fuel cell design uses a solid polymer electrolyte (SPE) membrane or proton exchange membrane (PEM), to provide ion exchange between the anode and cathode. Gaseous and liquid fuels are useable within fuel cells. Examples include hydrogen and methanol, with hydrogen being favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. A typical fuel cell is described in U.S. Pat. No. 5,272,017 and U.S. Pat. No. 5,316,871 (Swathirajan et al.).

Degradation of fuel cell components, especially MEAs and PEMs, leads to a decline in power output and useful life.

SUMMARY OF THE INVENTION

The Polymer Electrolyte Membrane (PEM) is a crucial component in a typical PEM Fuel Cell. Currently, PEM fuel cells are made of perfluorinated ionomers such as DuPont's Nafion®. Neither perfluorinated nor hydrocarbon ionomers have demonstrated acceptable durability (lifetime>5,000 hours) under fuel cell operation conditions. Without wishing to be held to any particular theory, the following is thought to apply. Even though the exact mechanism for ionomer degradation in a typical fuel cell is not entirely understood, it is generally believed to be linked to the very aggressive chemical environment within a fuel cell, particularly the attack on the ionomer by radicals generated during the operation. This invention provides a method to mitigate the iononmer degradation and thus yield an enhanced fuel cell life. In one aspect, mitigation is accomplished by including a constituent in the fuel cell that inhibits, stops, or prevents this degradation process by scavenging or neutralizing, mitigating or countering the effect of the species most responsible for degradation. The preferred mechanism for mitigation utilizes hydroquinone. The preferred method to prevent degradation is presented here using durable hydrocarbon ionomers by introducing structural moieties (such as hydroquinones) into the polymer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
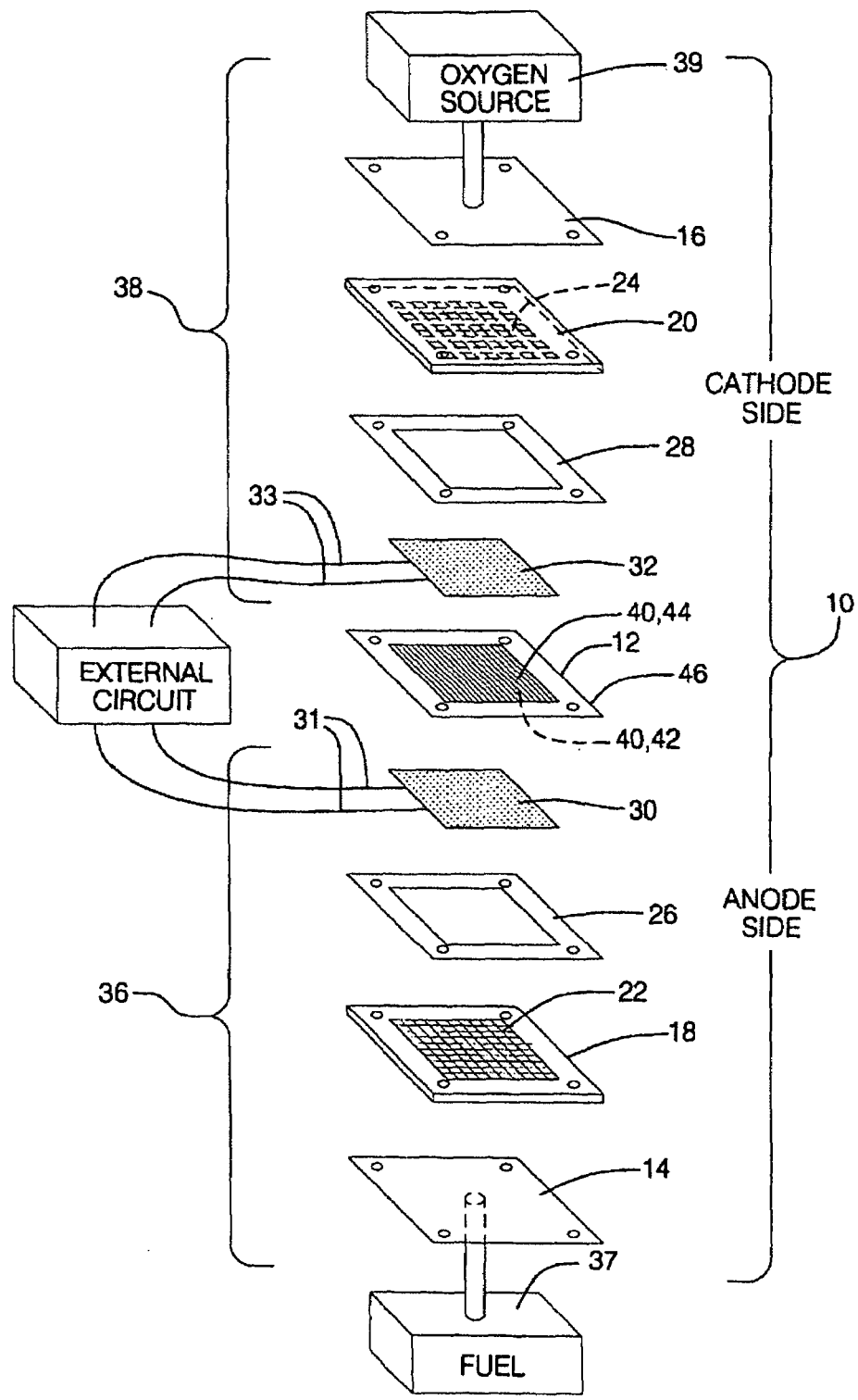
FIG. 1 is a schematic view of an unassembled electrochemical fuel cell having a membrane electrode assembly (MEA) according to the invention.

The invention is directed to forming electrodes and membrane electrode assemblies (MEAs) for use in fuel cells. Before describing the invention in detail, it is useful to understand the basic elements of an exemplary fuel cell and the components of the MEA. Referring to FIG. 1, an electrochemical cell 10 with a combination membrane electrolyte and electrode assembly 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14,16, graphite blocks 18,20 with openings 22,24 to facilitate gas distribution, gaskets 26,28, carbon cloth current collectors 30,32 with respective connections 31,33 and the membrane electrolyte and electrode assembly 12.

The two sets of graphite blocks, gaskets, and current collectors, namely 18, 26, 30 and 20, 28, 32 are each referred to as respective gas and current transport means 36,38. Anode connection 31 and cathode connection 33 are used to interconnect with an external circuit, which may include other fuel cells.

Electrochemical fuel cell 10 includes gaseous reactants, one of which is a fuel supplied from fuel source 37, and another is an oxidizer supplied from source 39. The gases from sources 37,39 diffuse through respective gas and current transport means 36 and 38 to opposite sides of the MEA 12. Respectively, 36 and 38 are also referred to as electrically conductive gas distribution media.

Figure 2:
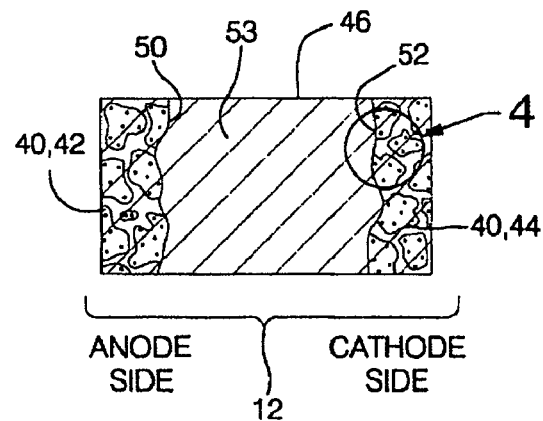
FIG. 2 is a pictorial illustration of a cross-section of an MEA according to the invention.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10. The electrodes of the invention provide proton transfer by intimate contact between the electrode and the ionomer membrane to provide essentially continuous polymeric contact for such proton transfer. Accordingly, the MEA 12 of cell 10 has membrane 46 with spaced apart first and second opposed surfaces 50, 52, a thickness or an intermediate membrane region 53 between surfaces 50, 52. Respective electrodes 40, namely anode 42 and cathode 44 are well adhered to membrane 46, at a corresponding one of the surfaces 50, 52.

Figure 3:
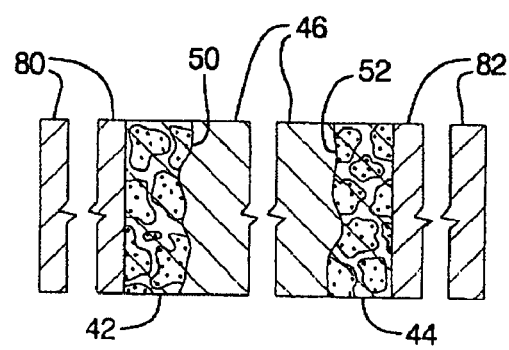
FIG. 3 is a pictorial illustration of an MEA as in FIG. 2, and having graphite sheets.

In one embodiment, respective electrodes 40 (anode 42, cathode 44) further comprise respective first and second Teflonated (polytetrafluoroethylene coated, impregnated) graphite sheets 80, 82, at respective sides of membrane 46. (FIG. 3) The anode active material is disposed between the first surface 50 of the membrane and the first sheet 80; the cathode active material is disposed between the second surface 52 and the second sheet 82. Each Teflonated sheet 80, 82 is about 7.5 to 13 mils thick.

Figure 4:
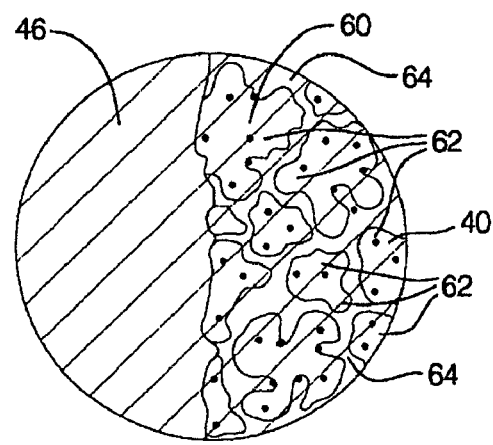
FIG. 4 is a pictorial illustration showing a magnified view of a portion of the cathode side of FIG. 2.

As shown in FIG. 4, each of the electrodes 40 are formed of a corresponding group of finely divided carbon particles 60 supporting very finely divided catalytic particles 62 and a proton conductive material 64 intermingled with the particles. It should be noted that the carbon particles 60 forming the anode 42 may differ from the carbon particles 60 forming the cathode 44. In addition, the catalyst loading at the anode 42 may differ from the catalyst loading at the cathode 44. Although the characteristics of the carbon particles and the catalyst loading may differ for anode 42 and cathode 44, the basic structure of the two electrodes 40 is otherwise generally similar, as shown in the enlarged portion of FIG. 4 taken from FIG. 2.

In order to provide a continuous path to conduct H.sup.+ ions to the catalyst 62 for reaction, the proton (cation) conductive material 64 is dispersed throughout each of the electrodes 40, is intermingled with the carbon and catalytic particles 60,62 and is disposed in a plurality of the pores defined by the catalytic particles. Accordingly, in FIG. 4, it can be seen that the proton conductive material 64 encompasses carbon and catalytic particles 60,62.

The solid polymer electrolyte membrane (PEM) of the fuel cell is a well-known ion conductive material. Typical PEMs and MEAs are described in U.S. Pat. Nos. 6,663,994, 6,566,004, 6,524,736, 6,521,381, 6,074,692, 5,316,871, and 5,272,017, each of which is attached hereto and made a part hereof, and each of which is assigned to General Motors Corporation.

The PEM is formed from ionomers and the method of forming membranes from ionomers is well known in the art. Ionomers (i.e., ion exchange resins) are polymers containing ionic groups in the structures, either on the backbone or side chain. The ionic groups impart ion exchange characteristics to the ionomers and PEM.

Ionomers can be prepared either by polymerizing a mixture of ingredients, one of which contains an ionic constituent, or by attaching ionic groups onto non-ionic polymers.

One broad class of cation exchange, proton conductive resins is the so-called sulfonic acid cation exchange resins, which rely on hydrated sulfonic acid groups for conducting protons. The preferred PEMs are perfluorinated sulfonic acid types. These membranes are commercially available. For example, Nafion® the trade name used by E.I. DuPont de Nemours & Co. Others are sold by Asahi Chemical and Asahi Glass Company, etc. PEMs of this type are made from ionomers obtained by copolymerizing tetrafluoroethylene (TFE) and perfluoro vinyl ether (VE) monomer containing sulfonyl fluoride, followed by a post-treatment that converts sulfonyl fluorides into sulfonic acid groups. Examples of VE monomers are:

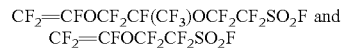

$CF_2=CFOCF_2CF(CF_3)OCF_2CF_2SO_2F$ and
$CF_2=CFOCF_2CF_2SO_2F$

The components of cell 10 are prone to degradation or decomposition through attack by peroxide anions and radicals, which are generated in cell 10. The MEA is particularly subject to attack. There is a particular problem on the cathode side of the fuel cell layer: side reactions generate the contaminant peroxide. Note that peroxides can also be generated on the anode side because of the crossover of oxygen through the membrane.

In view of the above difficulty, the invention provides a fuel cell comprising an MEA having a PEM, solid polymer electrolyte membrane sandwiched between first and second electrodes along with a constituent to mitigate contaminant peroxide otherwise damaging to one or more components of the fuel cell, such as the MEA. In one aspect, the cell includes at least one constituent in ion-transfer relationship with the contaminant peroxide, where the constituent prevents, or at least inhibits, decomposition of one or more cell components by the contaminant peroxide.

In one aspect, the membrane comprises a polymer and the constituent comprises a functional group forming a part of the polymer. In another aspect, at least one of the first and/or second electrode(s) comprises polymer and the constituent comprises a functional group forming a part of the polymer. The aforesaid functional groups are exemplified by radical scavengers and substances that decompose peroxides. In a further aspect, the constituent prevents degradation of one or more other cell component(s), such as gasket, current collector sheets, Teflon® supports and the like. In yet another aspect, the constituent is an additive that is included in the cell in the form of a dispersed solid or a liquid. Examples of such additives are radical scavengers and substances that decomposes peroxides.

Any combination of radical scavengers and substances that decompose peroxides may be added to the fuel cell in order to remove the peroxide radical contaminants. Among these are phenol derivatives, particularly hindered phenols, diphenols, and polyphenols. Other general classes of additives include: amines, such as hindered amines and aromatic amines; compounds containing divalent sulfur, such as thioethers; trivalent phosphorus, hindered phenol derivatives of phosphours; and polymers such as derivatives of a trimethyl quinoline polymer.

Naturally occurring substances may also be added. Those include such compounds as ascorbic acid, alfa-tocopherol, and enzymes such as superoxide dismutase and catalase.

Metal oxides are also useable such as cerium oxide particles of micrometer or nanometer size. Generally, any additive that can act as a radical scavenger can be used, with due consideration to the stability of the cell performance. That is, the additive should not affect the catalyst or the membrane.

Substances derived from these many classes of constituents may be combined into additive packages consisting of multiple components. Additionally, substances that contain one or more of the same or different functional groups may be used.

In another aspect, the constituent is electrophilic or is included in the cell in a state where it is non-electrophilic but is reduced in the cell and becomes capable of functioning as an electrophile.

In one aspect, the constituent is regenerated in the electrochemical cell. Thus, the constituent is used to mitigate peroxide damage whereby it changes to a different state or composition. Then the constituent is regenerated.

In an alternative embodiment, the constituent is functional to prevent decomposition or degradation and is not regenerable.

In one aspect, the constituent is a functional group on the Nafion-type polymer of the membrane, the electrode or both. The constituent is a functional group on a copolymer included in the membrane, the electrode or both. In another aspect, the constituent is grafted onto the Nafion-type polymer or copolymer in the membrane, electrode or both.

In one aspect, the MEA comprises one or more polymers, including a proton conductive polymer and the constituent is a functional group in at least one polymer and/or at least one copolymer of the MEA. By copolymer, we mean that the constituent is part of the polymer backbone. As such this could be a homopolymer or a copolymer. The copolymer backbone would consist of repeating units of the constituent monomer as well as repeating units of one or more different monomers. These repeating units may be periodic or sequential or random. Furthermore, one or more derivatives of the constituent monomer may be present in this composition.

In another aspect, the MEA comprises one or more polymers, including a proton conductive polymer and in at least one of the polymers, the constituent is grafted and exists as a group that is pendant to the main polymer chain. Other constituent groups (derivatives) may also be present as grafts. Grafts consisting of constituent groups and groups that modify other traits may be present together. These other functional groups could be ionomeric groups for providing proton conductivity, reactive groups that would allow crosslinking, or groups that would in some way modify other characteristics, like but not limited to flexibility, strength, and thermal statility.

The overall function of the constituent is primarily to minimize membrane (ionomer) degradation in a proton exchange membrane (PEM) fuel cell. This is essentially accomplished by trapping and neutralizing (scavenging) the primary species responsible for degradation (peroxide radicals) before they can attack the ionomer. In a preferred embodiment, the scavenger, or stabilizer, is recycled back into its original form. Thus, the scavenger will essentially act as a catalyst that turns peroxides into harmless compounds while itself returning to its original form. An additional advantage is obtained from stabilizing the cell membrane: corrosion of the plates and catalyst is inhibited since the by-products of membrane degradation, fluoride anions, promote corrosion. Further details as to the mechanism are described immediately below.

The reduction of oxygen is a combination of electrochemical and chemical processes that results in some by-products that can damage the membrane. The most harmful by-product of this process are the hydroxide (HO·) and peroxide radicals (HO$_2$·). The kinetics of oxygen reduction depends strongly on the working medium. The mechanism of oxygen reduction is depicted in FIG. 5.

In an acidic medium:
protonation of O$_2^-$· is fast and the dominant reaction;
the radical peroxide, HO$_2$· is relatively stable.

Figure 5:
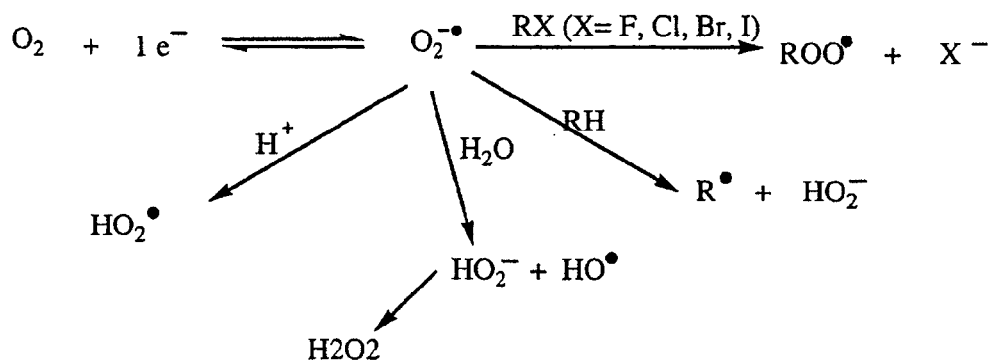
FIG. 5 depicts the mechanism of oxygen reduction and contaminant and peroxide formation.

Accordingly, based on the mechanisms of FIG. 5, the radical peroxide, HO$_2$· can be involved in chemical and electrochemical processes as:

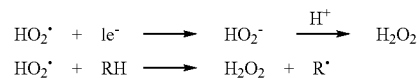

The peroxide anion, HO$_2^-$, is a powerful nucleophile. In the presence of RX, it can react through an SN2 mechanism to release halogen anions, X$^-$. The Nafion® ionomer contains a fluorinated backbone and subsequently is susceptible to reaction with the peroxide anion. The subsequently released fluoride anion, F$^-$, catalyzes the oxidation of base metals from the plates, case, and catalyst. These metal cations degrade PEM performance by cross linking the ionic portions of the polymer, making them unavailable for proton conduction.

Iron, released by corrosion of the plates and casing, promotes Fenton's reaction which takes place in the presence of metal cations, such as Fe$^{II}$. The reaction can be depicted as:

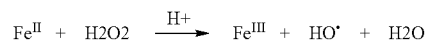

The most important species responsible for degrading fuel cell membranes are peroxide anions and radicals (·OH, ·O$_2$H). Subsequently, the release of cationic iron further adds to the production of harmful species in the cell.

The present invention mitigates inhibits, stops or prevents this degradation process by scavenging the species, or neutralizing, mitigating or countering the effect of the species, most responsible for degradation. The preferred mechanism for mitigation utilizes hydroquinone.

Figure 6:
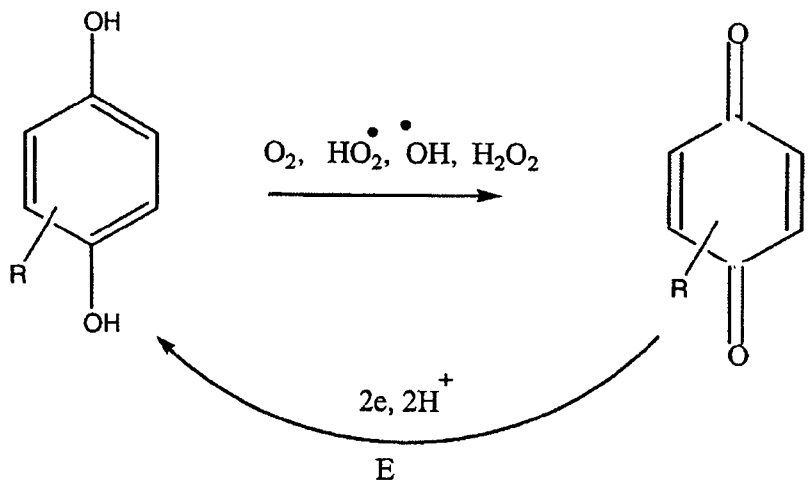
FIG. 6 depicts the oxidation of the hydroquinone alcohol (hydroxyl) to neutralize peroxide. It also shows the reverse reaction of the resultant quinone (Q) carbonyl to reform the hydroquinone (HQ).
Figure 7:
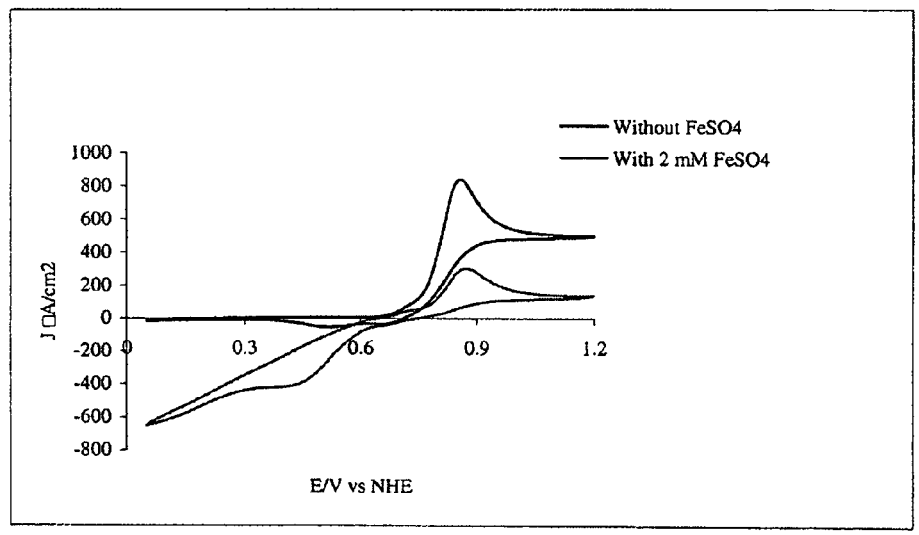
FIG. 7 shows test results for HQ as an hydroxyl radical scavenger. The test was performed at 24° C. in 0.5 M aqueous $H_2SO_4$ (GFS Chemicals) at a 10 mV/s scan rate under argon atmosphere, with glassy carbon as the working electrode; reagent concentrations were: 0.5 mM HQ; 2 mM $FeSO_4$; 10 mM $H_2O_2$.
Figure 8:
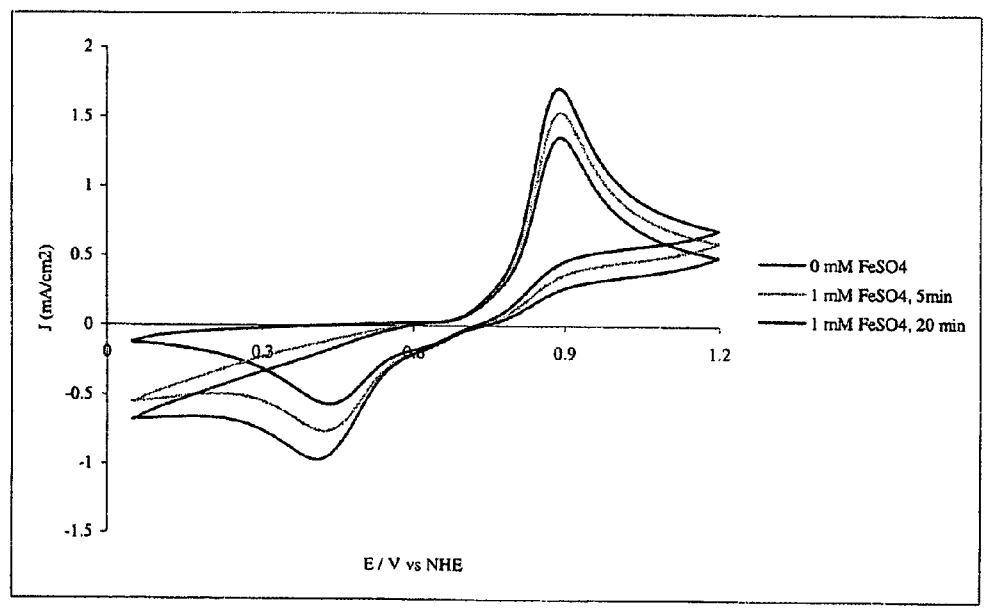
FIG. 8 shows test results for HQ as an hydroxyl radical scavenger. The test was performed under the following conditions: 24° C. in 0.5 M aqueous $H_2SO_4$ (GFS Chemicals) at a 50 mV/s scan rate under argon atmosphere, with glassy carbon as the working electrode; reagent concentrations were: 0.5 mM HQ; 1 mM $FeSO_4$; 10 mM $H_2O_2$. Cyclic voltammograms were recorded at different times.

Hydroquinone derivatives are reactive towards peroxides. Hydroquinones, grafted as a side chain to the ionomer electrolyte, or incorporated in the polymer chain as a copolymer, or included as a blend inhibit peroxides from reacting with the ionomer, especially in the cathode side of fuel cells. In acidic medium, quinone derivatives produced from the reaction of peroxide are reduced electrochemically. The net effect is that radicals are quenched while the concentration of radical quencher (hydroquinone) remains unchanged in the process. This is demonstrated in FIG. 6, where the hydrogen peroxide and the hydroxide radicals are eventually converted to water. Results of testing hydroquinone (HQ) are shown in FIGS. 7 and 8.

The reduction potential, E, of quinone derivatives depends on the substituent, R. Therefore, it is important to have systems that undergo an electrochemical reduction at a more positive potential. That is, close to that of oxygen reduction in acidic medium. This is achieved by modifying the substituents on the rings.

Figure 9:
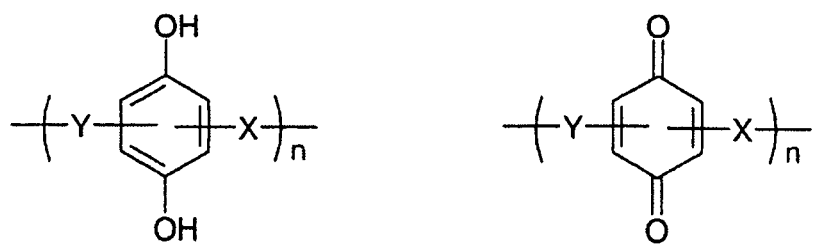
FIG. 9 shows main chain hydroquinone and quinone containing polymers, X and Y, being arbitrary structures.
Figure 10:
FIG. 10 shows side chain hydroquinone and quinone containing polymers, main chain and side chain linkage R being arbitrary.
Figure 11:
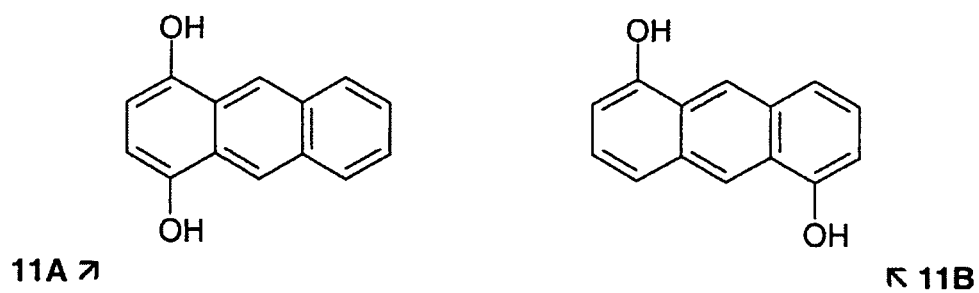
FIG. 11 shows other radical scavengers incorporated into the polymer main chain or side chain similar to FIGS. 9 and 10. Such examples include those shown in FIG. 11; namely 11A is 1,4-anthracenediol and 11B is 1,8-anthracenediol. Their corresponding oxidative counterparts are as exemplified by the hydroxide and carbonyl of FIG. 9.

Referring to FIGS. 9–11, the aforesaid chemistry is used in designing a durable fuel cell polymer electrolyte membrane, incorporating radical quenching functionalities of the broad classes of constituents described above, and preferably hydroquinone or derivatives of quinones, such as anthraquinones, naphthoquinones, or other species containing a 1,4-diketone or 1,4-diol in an unsaturated 6-membered ring into the structures of polymer backbones. These functional moieties are incorporated either on the side chain (grafted) or the main chain (copolymer) of the polymer. These two functionalities are incorporated into the same polymer, or separately into two or more polymers and a blend of the polymers can be used. In a preferred aspect, the backbone is not acid sensitive because of the acidic environment in a fuel cell. Other criteria for the polymer include that it is durable and not undergo degradative reactions in a fuel cell in the condition of the process shown in FIG. 6. It is possible to blend the aforesaid broad classes of constituents, such as the preferred hydroquinone or other low molecular weight derivatives of hydroquinone, directly into an existing PEM. It is also contemplated to include such constituents as an additive in a fuel ($H_2$) or oxidant ($O_2$) feed stream so as to replenish the supply of such constituent additive. It should be noted that hydroquinone is a relatively small, water soluble molecule and it can easily diffuse out of the membrane. As shown in FIG. 6, the hydroquinone alcohol is oxidized to form a carbonyl quinone as the peroxide is essentially neutralized. In the reverse process, the quinone carbonyl is reduced in the fuel cell acidic environment to regenerate the hydroquinone alcohol (hydroxyl).

A number of terms are used herein as follows: A and an as used herein indicates "at least one" of the item is present; a plurality of such items may be present, when possible. About, when applied to values, indicates that the calculation or the measurement allows some slight imprecision in the value (with some approach to exactness in the value; approximately or reasonably close to the value; nearly). If, for some reason, the imprecision provided by about is not otherwise understood in the art with this ordinary meaning, then about as used herein indicates a possible variation of up to 5% in the value. A derivative is a compound containing the same reactive functional groups as the original compound, but differing in structure or composition from the original. A copolymer is a polymer with more than one different repeating group (monomer) in its backbone chain. A grafted polymer consists of a backbone with one or more repeating units and with functional groups attached to the those units. The functional groups are not part of the backbone, but may or may not repeat regularly along the chain. A hindered amine, or phenol, is a compound in which the motions of chemical groups is inhibited. This can occur because the groups are extremely bulky, but most commonly they are hindered in their motions because of an incorporation into a ring structure. As used herein MEA refers to the membrane electrode assembly and any of its individual parts, alone or in combination. The constituent is referred to as being included in the MEA, for ease of description; however, it is to be understood that the constituent may be in the fuel cell anywhere, including the membrane, electrode or both.

Example: An electrochemical experiment on hydroquinone in acidic medium, 0.5 M $H_2SO_4$, was performed to model performance in a fuel cell acidic environment. The results are presented below (FIGS. 7 and 8). $FeSO_4$ and $H_2O_2$ were used to generate hydroxide radical, HO. (Fenton's Reaction). Referring to FIGS. 7 and 8, cyclic voltammetry of HQ on a glassy carbon electrode was carried out in de-aerated 0.5 M $H_2SO_4$. The voltammogram shows an anodic peak at a potential 0.89 V/NHE, followed by a cathodic peak at 0.5V/NHE. The anodic peak corresponds to the oxidation of HQ to form Q,

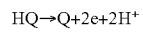

and the cathodic peak corresponds to the reduction of Q to its original form HO,

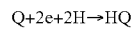

As shown, in the presence of $H_2O_2$ and $FeSO_4$, the anodic peak current decreased while the cathodic current increased. As the peak current is proportional to the concentrations of HQ or Q at the electrode-electrolyte interface, it is obvious to conclude that hydroquinone reacts quickly with the hydroxide radical (formed by reaction between $Fe^{II}$ and $H_2O_2$) to form the quinone and that this later is reduced electrochemically to the original form. By using this material as a scavenger for any radical present in the fuel cell environment, the lifetime of the membrane is significantly increased and subsequently fuel cell durability is enhanced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
   a membrane electrode assembly (MEA) comprising a membrane sandwiched between first and second electrodes;
   contaminant peroxide damaging to the MEA; and
   at least one constituent present with the contaminant peroxide that prevents, or at least inhibits, decomposition of at least one of: the first electrode; the second electrode; the membrane; and any combination thereof, wherein the at least one constituent is a member selected from the group consisting of phenols, phenol derivatives, hindered phenols, di-phenols, poly-phenols, amines, hindered amines, aromatic amines, compounds containing divalent sulfur, constituents comprising a trivalent phosphorous, hindered phenol derivatives of phosphorous, polymeric derivatives of trimethyl quinoline polymers, ascorbic acid, alpha-tocopherol, enzymes, functional groups on polymers, constituents that are part of polymer and copolymer backbones, constituents that are grafted to polymers and copolymers, and combinations thereof.

2. The fuel cell of claim 1, wherein the constituent comprises a radical scavenger.

3. The fuel cell of claim 1, wherein the constituent comprises a substance that decomposes peroxide.

4. The fuel cell of claim 1, wherein the at least one constituent comprises a mixture of the constituents.

5. The fuel cell of claim 1, wherein the membrane comprises a polymer and the constituent is a functional group forming a part of the polymer.

6. The fuel cell of claim 1, wherein at least one of the electrodes comprises a polymer and the constituent is a functional group forming a part of the polymer.

7. The fuel cell of claim 1, wherein the constituent comprises an additive in the form of a solid or a liquid dispersed in the cell.

8. The fuel cell of claim 7, wherein the dispersed additive is a radical scavenger.

9. The fuel cell of claim 7, wherein the dispersed additive is a substance that decomposes peroxide.

10. The fuel cell of claim 1, wherein the constituent Is a phenol or phenol derivative.

11. The fuel cell of claim 1, wherein the constituent is selected from a group consisting of hindered phenols, diphenois and poly-phenols, and mixtures thereof.

12. The fuel cell of claim 1, wherein the constituent comprises an amine.

13. The fuel cell of claim 12, wherein the amine is selected from a group of hindered amine and aromatic amine.

14. The fuel cell of claim 1, wherein the constituent comprises a compound containing divalent sulfur.

15. The fuel cell of claim 14, wherein the compound containing divalent sulfur is a thioester.

16. The fuel cell of claim 1, when the constituent comprises a trivalent phosphorous.

17. The fuel cell of claim 1, wherein the constituent comprises a hindered phenol derivative of phosphorous.

18. The fuel cell of claim 1, wherein the constituent comprises a polymeric derivative of a trimethyl quinoline polymer.

19. The fuel cell of claim 1, wherein the constituent comprises at least one selected from the group consisting of ascorbic acid, alpha-tocopherol, and enzymes.

20. The fuel cell of claim 19, wherein the enzyme is selected from superoxide dismutase and catalase, and mixtures thereof.

21. The fuel cell of claim 1, wherein the MEA comprises one or more polymers, including a proton conductive polymer and the constituent is a functional group on at least one of the polymers.

22. The fuel cell of claim 1, wherein the MEA comprises one or more polymers, including a proton conductive polymer and the constituent is a functional group in a polymer or copolymer of the MEA.

23. The fuel cell of claim 22, wherein the constituent is a part of the polymer or copolymer backbone.

24. The fuel cell of claim 1, wherein the MEA comprises one or more polymers, including a proton conductive polymer and at least one of the polymers includes the constituent grafted to said polymer.

25. The fuel cell of claim 24, wherein the graft constituent comprises a group pendant to a main polymer chain.

26. A method for preventing decomposition of one or more fuel cell polymeric components by peroxide contaminant species, said method comprising providing in the cell a constituent that is oxidized when reacted with the peroxide to neutralize at least a portion of the peroxide in the cell, wherein the constituent comprises hydroxyl that is oxidized to form a carbonyl.

27. The method of claim 26, wherein the carbonyl is subsequently reduced to form hydroxyl.

28. The method of claim 26, wherein the hydroxyl is regenerated by electrochemical reduction of the carbonyl in the fuel cell in the presence of an acid.

29. The method of claim 26, wherein the hydroxyl is an alcohol and the carbonyl is a ketone.

30. The method of claim 26, wherein the hydroxyl is a hydroquinone or derivative thereof and the carbonyl is a quinone or a derivative thereof.

* * * * *